United States Patent [19]

Skrycki

[11] Patent Number: 4,955,621
[45] Date of Patent: Sep. 11, 1990

[54] GASKET

[75] Inventor: Robert R. Skrycki, Grosse Ile, Mich.

[73] Assignee: JPI Transportation Products, Inc., Ann Arbor, Mich.

[21] Appl. No.: 410,877

[22] Filed: Sep. 22, 1989

[51] Int. Cl.⁵ .............................................. F16J 15/12
[52] U.S. Cl. .................................. 277/166; 277/180; 277/235 B
[58] Field of Search ................ 277/235 B, 235 R, 166, 277/180

[56] References Cited

U.S. PATENT DOCUMENTS

| | | | |
|---|---|---|---|
| 3,930,656 | 1/1976 | Jelinck | 277/166 |
| 4,213,620 | 7/1980 | Kennedy et al. | 277/235 B |
| 4,625,979 | 12/1986 | Inciong | 277/235 R |
| 4,817,969 | 4/1989 | McDowel et al. | 277/166 |

FOREIGN PATENT DOCUMENTS

| | | | |
|---|---|---|---|
| 977382 | 11/1975 | Canada | 277/235 B |
| 836584 | 6/1960 | Fed. Rep. of Germany | 277/235 B |
| 2816383 | 10/1979 | German Democratic Rep. | 277/235 B |
| 0255253 | 11/1986 | Japan | 277/235 B |

Primary Examiner—Allan N. Shoap
Assistant Examiner—Daniel G. DePumpo
Attorney, Agent, or Firm—Harness, Dickey & Pierce

[57] ABSTRACT

A gasket comprising a perforated steel body and a rubber sealing member disposed thereon. The gasket body has a plurality of bolt holes therethrough and at least one rubber compression limiter, disposed upon the body, so as to limit compression of the sealing member. The limiter has a relatively large area and small height in comparison to the sealing member and serves to protect the sealing member from overcompression.

4 Claims, 1 Drawing Sheet

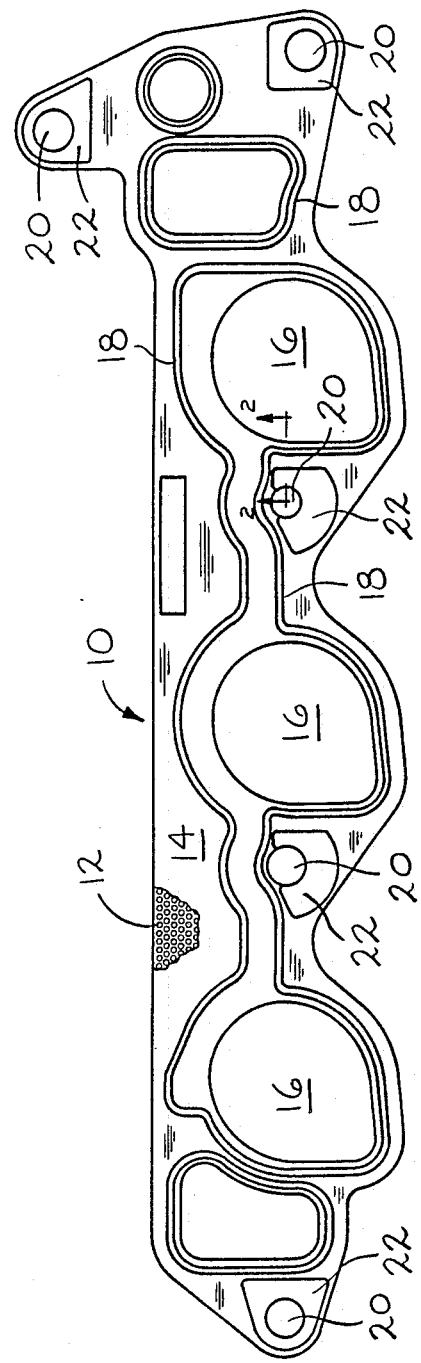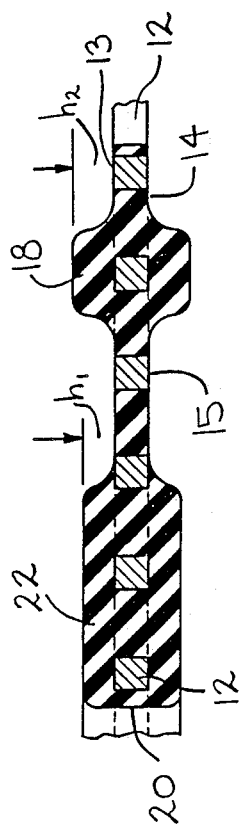

GASKET

BACKGROUND AND SUMMARY OF THE INVENTION

This invention relates to a gasket and more particularly to an intake manifold gasket having a rubber compression limiter and a rubber sealing member disposed thereon.

Gaskets are typically placed between a pair of mated mechanical components having a quantity of fluid contained between them. The gasket, so placed, acts to seal the contained fluid so as to prevent the fluid from escaping into the surrounding area.

These gaskets usually contain a plastic core upon which rubber or fiber type material is placed. The core and deposited material define the body of the gasket. A number of openings are placed through the gasket body, each opening allowing a single shank of a conventional fastener, such as a stud bolt, to pass therethrough thereby securing the gasket between the mated components. A raised rubber sealing member is also deposited upon the gasket body and cooperates with the body to provide the aforementioned sealing action. Such sealing members may be placed upon both sides of the gasket body.

These prior gaskets have also included compression limiters, placed upon the gasket body, which have limited the amount by which the raised rubber sealing members may be compressed. Such compression is known to result from many sources including the compressing action of the attachment bolt head. These limiters have proven to be an important part of the gasket design since overcompression may result in structural damage to the sealing member and may result in a concominant loss of sealing ability.

These previous limiters were typically made of metal and were ordinarily placed upon and attached to the body of the gasket. In some previous designs, the metal limiters were replaced with a groove placed upon the plastic core and the sealing member was normally placed within the groove. The depth of the groove compared to the height of the rubber sealing member determined the maximum compression of the member.

Two separate molding steps are required to manufacture these prior gaskets. One molding step was needed to mold the plastic core and the other to mold the sealing member thereon. Additionally, the manufacture of these gaskets usually required the additional step of securing the metal limiters to the core or the creation of the limiter grooves thereon. If sealing members were required on both sides of the gasket, holes were usually placed through the core to facilitate this two-sided molding of the sealing members upon the body.

While these prior gaskets have proven to provide effective sealing action they have many drawbacks. That is, the manufacturing costs associated with these gaskets is relatively high due to the two required molding steps, the separate attachment of the metal limiters, and the placement of the holes through the core. Additionally, these prior gaskets have great variations in the height of the compression limiter relative to the height of the sealing member. This variation not only causes great differences in compression tolerances across a wide range of manufactured gaskets but also causes differences in compression tolerances within a single gasket wherein these differences depend upon the point that the sealing member is being compressed.

It is therefore an object of this invention to provide a gasket having a compression limiter of the same material as the sealing member and having a relatively low height and large compression area compared to the sealing member so as to prevent the overcompression of the sealing member.

It is another object of this invention to provide a gasket having a compression limiter and sealing member disposed thereon wherein, the height of the sealing member is greater than the height of the compression limiter so that the seal member is compressed to achieve the desired gasket action before the limiter is engaged to prevent undue compression of the seal.

It is yet another object of this invention to provide a gasket having a perforated steel body and having a relatively low manufacturing cost.

These and other aspects, features, advantages, and objects of this invention will be more readily understood upon reviewing carefully the following detailed description taken in conjunction with the accompanying drawings and appended claims.

BRIEF DESCRIPTION OF THE DRAWINGS

The various advantages of the present invention will become apparent to those skilled in the art by reading the following specification and by reference to the drawings in which:

FIG. 1 is a top view of an intake manifold gasket made in accordance with the teaching of the preferred embodiment of this invention; and FIG. 2 is an enlarged sectional view of the gasket shown in FIG. 1 taken substantially along line 2—2.

DETAILED DESCRIPTION OF THE PREFERRED EMBODIMENT

Referring now to FIG. 1 there is shown an intake manifold gasket 10 consisting of a substantially planar flat core 12 formed of perforated steel and having flat top and bottom surfaces 13 and 15, respectfully. A body 14 of rubber or other similar material is deposited on the core 12 so as to substantially encapsulate the core 12.

The gasket 10 has a plurality of openings 16 through which air flows, each of which allows corresponding openings in two conventional mated machined parts (not shown), between which the gasket 10 is placed, to be in communication. The gasket 10 also has raised seal members 18 or beads, formed of a compressible material such as rubber or similar material, which cooperate with body 14 to seal the mated machined parts so that air flowing through the openings 16 will not leak between the machined parts.

Body 14 further defines a plurality of attachment bolt openings 20 each of which allows a bolt to pass through and enable the gasket 10 to seal the joint between the mated machined parts. In close proximity to substantially every opening 20 is a rubber compression limiter 22.

The limiters 22 are of the same height $h_1$ which is substantially lower than the height $h_2$ of the seal members 18. In contrast, the width of each limiter 22 is many times greater than the width of seal members 18 which are very narrow.

The seal members or beads 18, as they are often called, are sufficiently narrow to allow lateral displacement of the rubber, or like material from which they are formed, to thereby enable compression of the beads 18 when loaded. Such loading occurs when the gasket 10 is clamped between the mating parts.

The limiters 22, however, are of sufficient area, in horizontal section, to preclude any compression of the limiters when similarly loaded.

The limiters 22 are positioned at the bolt holes 20 so that they prevent the mating parts from being distorted during tightening of the bolts. This positioning of the limiters 22 also locates the limiters 22 at high unit loading areas of the beads 18 so as to protect the beads 18 against damage from overcompression.

It is also to be noted that in all cases the limiters 22 are spaced from the adjacent bead 18 sufficiently to allow for the heretofore described lateral expansion of the adjacent bead 18.

In operation, the gasket 10 is placed upon a first machined part (not shown), such as a manifold casting, and attached thereto by securing another part (not shown) to the manifold casting so that the gasket is clamped between the parts so as to prevent fluid leaks from occurring in the planar area between the parts. Attachment bolts in the parts (not shown) are extended through the gasket openings 20 and tightened so that the gasket 10 seals the joint between the parts.

During clamping of the gasket 10 between the mating parts, the seals 18, which are higher than the limiters 22, are subjected to compressing forces which tend to compress the seals 18 and improve their ability to seal around the openings 16. As the compressive forces on the seals 18 are increased they expand laterally and the height $h_2$ of the seals 18 is decreased. When the height of the seals is reduced to the height $h_1$ of the limiters 22, the limiters 22 are also subjected to the compressive forces. However, by virtue of the large horizontal area of the limiters 22, they are substantially incompressible so that further movement of the mating parts toward each other is prevented. The gasket beads 18 are thus fully functional at this time.

The result is a gasket 10 which retains its structural integrity and performs its sealing function effectively.

Gasket 10 is also relatively economical to manufacture since the use of the perforated metal core 12 eliminates the need to structure the core, during the manufacture of gasket 10, to accommodate the sealing members 18.

Additionally, only a single molding step is required in the manufacture of gasket 10 since the rubber seal members 18 and limiters 22 are molded in a substantially simultaneous manner. This single molding also eliminates the need to separately place the limiters 22 on body 14 and results in a more consistent relationship of the height of the limiters 24 to the height of the seals 18.

It is to be understood that the above-identified embodiment is merely illustrative of some of the many specific embodiments which represent applications of the principles of the present invention. Clearly, other arrangements can be readily devised by those skilled in the art without departing from the scope of the invention.

What is claimed is:

1. A gasket for sealing a joint between adjacent surfaces of mating mechanical components in order to prevent fluid leaks therebetween comprising:
   a substantially flat planar gasket core having attachment bolt openings extending therethrough, and having fluid passage openings formed therein, said openings being arranged in a predetermined spaced relation, at least one seal member of predetermined width and being formed of a compressible material on said core arranged so as to circumscribe at least one of said fluid openings, said predetermined width being sufficiently narrow to enable displacement of the seal material in directions substantially parallel to the plane of said core, said seal member also being of a predetermined height in a direction perpendicular to the plane of said core;
   a compression limiter formed of the same compressible material as said seal member and being disposed upon said core in close proximity to said bolt openings but spaced from said seal member, said limiter being in a plane substantially parallel to the plane of said core and being of an area sufficiently great to be substantially incompressible in a direction parallel to the height of said seal member, the height of said limiter being less than said height of said seal member so that when said surfaces are moved toward each other said seal member will be compressed until said limiter is engaged between said surfaces.

2. An intake manifold gasket comprising:
   a flat perforated steel core adapted to be positioned in a plane and having flat top and bottom surfaces and a plurality of openings extending therethrough;
   at least one seal member formed of a compressible material secured to said core and circumscribing at least one of said openings, said seal member being of predetermined width measured in a direction parallel to said plane and a predetermined height extending outwardly from one of said surfaces of said core in a direction perpendicular to said plane, said predetermined width being sufficiently narrow to enable displacement of the seal material in directions substantially parallel to the plane of said core;
   at least one compression limiter of substantially the same material as said seal member and disposed upon said one surface of said core, said limiter having an area in a plane substantially parallel to the plane of said core and being sufficiently great to be substantially incompressible in a direction parallel to the height of said seal member, said limiter having a width substantially larger than said width of said seal member and of a height less than said predetermined height of said sealing member to thereby limit compression of said seal member to a height corresponding to the height of said limiter.

3. The gasket of claim 2 wherein said material of said sealing element and of said compression limiter is rubber.

4. The gasket of claim 3 wherein the material forming said seal member and said limiter substantially encapsulates said steel core.

* * * * *